(12) United States Patent
Darbandi et al.

(10) Patent No.: US 11,575,164 B2
(45) Date of Patent: Feb. 7, 2023

(54) STORAGE DEVICE FOR STORING ELECTRICAL ENERGY, IN PARTICULAR FOR A MOTOR VEHICLE, AND MOTOR VEHICLE

(71) Applicant: Bayerische Motoren Werke Aktiengesellschaft, Munich (DE)

(72) Inventors: Azad Darbandi, Unterfoehring (DE); Juergen Hildinger, Hoehenkirchen-Siegertsbrunn (DE); Florian Schoewel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 270 days.

(21) Appl. No.: 16/677,091

(22) Filed: Nov. 7, 2019

(65) Prior Publication Data

US 2020/0076028 A1 Mar. 5, 2020

Related U.S. Application Data

(63) Continuation of application No. PCT/EP2018/063236, filed on May 18, 2018.

(30) Foreign Application Priority Data

May 22, 2017 (DE) ..................... 10 2017 208 613.0

(51) Int. Cl.
*H01M 10/6556* (2014.01)
*H01M 10/613* (2014.01)
(Continued)

(52) U.S. Cl.
CPC ......... *H01M 10/6556* (2015.04); *B60L 50/64* (2019.02); *H01M 10/613* (2015.04);
(Continued)

(58) Field of Classification Search
CPC ........... H01M 10/6556; H01M 10/613; H01M 50/20; B60L 50/64
See application file for complete search history.

(56) References Cited

U.S. PATENT DOCUMENTS 8,100,211 B2 1/2012 Hoh et al.
2009/0220850 A1* 9/2009 Bitsche ............... H01M 10/643
429/50
(Continued)

FOREIGN PATENT DOCUMENTS

DE 10 2008 013 188 A1 9/2009
DE 10 2013 223 361 A1 5/2015
(Continued)

OTHER PUBLICATIONS

PCT/EP2018/063236, International Search Report dated Jul. 6, 2018 (Two (2) pages).
(Continued)

*Primary Examiner* — Jonathan G Jelsma
(74) *Attorney, Agent, or Firm* — Crowell & Moring LLP

(57) ABSTRACT

A storage device configured to store electrical energy, includes at least one storage element having an element housing which has at least one accommodating chamber and at least one element base which at least partially downwardly delimits the accommodating chamber in an installation position of the storage device. The storage device includes at least one storage means, accommodated in the accommodating chamber, configured to store electrical energy, wherein the at least one storage means comprises at least one degassing unit configured to discharge fluid, which is released in the accommodating chamber, from the accommodating chamber. The degassing unit is provided on the element base and is configured to downwardly discharge fluid from the accommodating chamber with respect to the installation position of the storage device.

8 Claims, 1 Drawing Sheet

(51) Int. Cl.
  *B60L 50/64* (2019.01)
  *H01M 50/20* (2021.01)
  *H01M 50/342* (2021.01)

(52) U.S. Cl.
  CPC ......... *H01M 50/20* (2021.01); *H01M 50/342* (2021.01); *H01M 2220/20* (2013.01)

(56) References Cited

U.S. PATENT DOCUMENTS

| | | |
|---|---|---|
| 2011/0200856 A1 | 8/2011 | Yasui et al. |
| 2013/0095355 A1* | 4/2013 | Okutani ................ H01M 50/20 |
| | | 429/88 |
| 2014/0234687 A1 | 8/2014 | Fuhr et al. |
| 2016/0248061 A1 | 8/2016 | Brambrink et al. |
| 2020/0243822 A1* | 7/2020 | Sodeyama .............. H02J 3/381 |

FOREIGN PATENT DOCUMENTS

| | | | |
|---|---|---|---|
| DE | 10 2014 200 193 A1 | 7/2015 | |
| DE | 10 2014 200 194 A1 | 7/2015 | |
| WO | WO-2017029865 A1 * | 2/2017 | .......... H01M 10/617 |

OTHER PUBLICATIONS

German Search Report issued in German counterpart application No. 10 2017 208 613.0 dated Jan. 10, 2018, with Statement of Relevancy (Eight (8) pages).

* cited by examiner

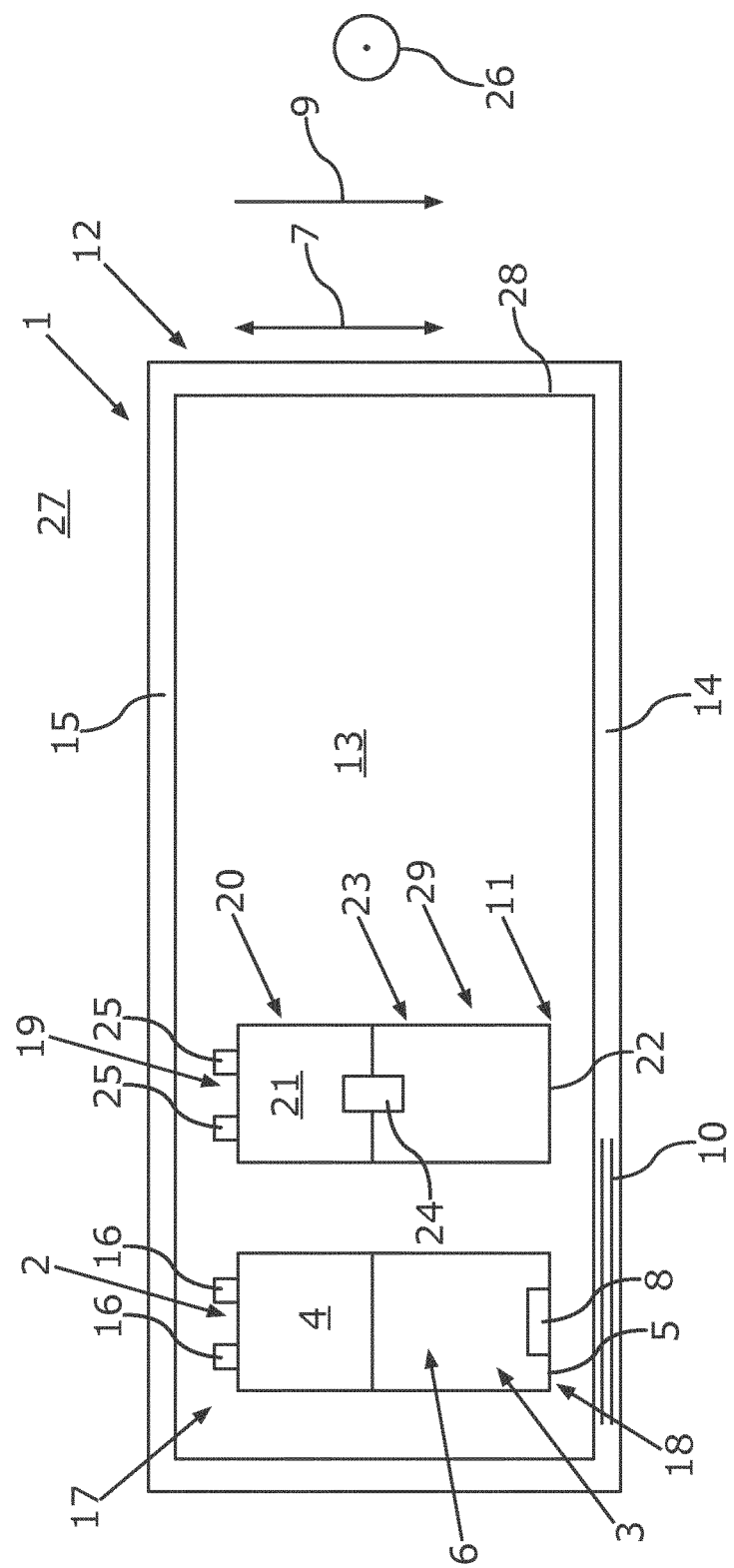

STORAGE DEVICE FOR STORING ELECTRICAL ENERGY, IN PARTICULAR FOR A MOTOR VEHICLE, AND MOTOR VEHICLE

CROSS REFERENCE TO RELATED APPLICATIONS

This application is a continuation of PCT International Application No. PCT/EP2018/063236, filed May 18, 2018, which claims priority under 35 U.S.C. § 119 from German Patent Application No. 10 2017 208 613.0, filed May 22, 2017, the entire disclosures of which are herein expressly incorporated by reference.

BACKGROUND AND SUMMARY OF THE INVENTION

The invention relates to a storage device for storing electrical energy, in particular for a motor vehicle. The invention further relates to a motor vehicle comprising at least one storage device of this kind.

A storage device of this kind for storing electrical energy, in particular for a motor vehicle, is already known from DE 10 2013 223 361 A1 for example. The storage device comprises at least one storage element which is designed as a storage cell for example. In particular, the storage element is designed as a battery cell for example, so that the storage device is designed as a battery, in particular as a high-voltage battery (HV battery), for example. The storage element has an element housing comprising at least one accommodating chamber. In this case, the element housing comprises at least one element base by way of which the accommodating chamber is at least partially downwardly delimited in the installation position of the storage device. In this case, the storage device assumes its installation position in the fully manufactured and mounted state of the storage device which is mounted, for example, in its fully manufactured and mounted state in the fully manufactured motor vehicle. In other words, the storage device assumes its installation position in the fully manufactured state of the motor vehicle for example. In this case, in particular, the accommodating chamber is at least partially, in particular at least predominantly or completely, downwardly delimited by the element base in the vertical direction, in particular in the height direction of the vehicle (z-direction).

The storage device, in particular the storage element, further has at least one storage means, which is accommodated in the accommodating chamber, for storing electrical energy. In this case, the storage means comprises, for example, an electrolyte and/or at least one electrode. In addition, at least one degassing unit is provided, by means of which a fluid which is released in the accommodating chamber, such as a gas stream for example, can be discharged from the accommodating chamber. The fluid, which is in particular in the form of gas or a gas stream, can be released, for example, as a result of an accident-related application of force to the storage device, wherein the fluid can emerge from the electrolyte for example. As the quantity of fluid which is released in the accommodating chamber increases, a pressure prevailing in the accommodating chamber for example increases. If, for example, the pressure exceeds a pre-specifiable threshold value, the degassing unit opens, for example, at least one discharge opening via which the fluid can flow out of the accommodating chamber, in particular to the area surrounding the storage element. An excessive value for the pressure can be avoided in this way.

Furthermore, DE 10 2014 200 193 A1 discloses a degassing device for a battery system, comprising at least one degassing pipe with an outlet opening for discharging a fluid which is released by a battery cell of the battery system.

In addition, DE 10 2014 200 194 A1 discloses, as known, a battery system comprising at least one battery cell with a degassing opening. Furthermore, a degassing device with at least one gas inlet opening is provided.

The object of the present invention is to provide a storage device and a motor vehicle of the kind mentioned at the outset, so that particularly safe operation can be realized.

A first aspect of the invention relates to a storage device for storing electrical energy or electric current, in particular for a motor vehicle. The storage device comprises at least one storage element which is designed as a storage cell for example. In particular, the storage element is designed as a battery cell for example, so that the storage device is designed as a battery, in particular as a high-voltage battery (HV battery), for example. Therefore, the storage device has, for example, an electrical voltage, in particular an electrical operating voltage, which has a value of more than 50 volts, in particular more than 60 volts. In particular, the storage device can provide an electrical voltage of more than 50 volts, in particular of more than 60 volts and in particular of several 100 volts, so that, for example, particularly high electrical powers for driving said motor vehicle can be realized in this way.

The storage element has an element housing with at least one accommodating chamber. In this case, the element housing comprises at least one element base by way of which the accommodating chamber is at least partially, in particular at least predominantly or completely, downwardly delimited in the installation position of the storage device. The storage device assumes its installation position in the fully manufactured and mounted state of the storage device which is mounted, for example, in its fully manufactured and mounted state in said motor vehicle. Therefore, the storage device assumes its installation position in the fully manufactured state of the motor vehicle for example. In this case, the accommodating chamber is at least partially, in particular at least predominantly or completely, downwardly delimited by the element base for example with respect to the installation position of the storage device in the vertical direction, in particular in the height direction of the vehicle (z-direction). Therefore, the vertical direction coincides with the height direction of the vehicle in the installation position of the storage device for example.

The storage device, in particular the storage element, has at least one storage means, which is accommodated in the accommodating chamber, for storing electrical energy or electric current. To this end, the storage means comprises, for example, an electrolyte and/or at least one or more electrodes.

In addition, the storage device comprises at least one degassing unit by means of which a fluid, which is released in the accommodating chamber, can be discharged from the accommodating chamber and therefore, for example, to an area surrounding the accommodating chamber or an area surrounding the storage element. The fluid is, for example, a gas or a gas stream which can be discharged from the accommodating chamber via the degassing unit. The fluid is released, for example, as a result of an accident or an accident-related application of force to the storage device, wherein the fluid emerges from said electrolyte for example.

As the quantity of fluid which is released in the accommodating chamber, in particular gas, increases, a pressure prevailing in the accommodating chamber for example increases, said pressure also being referred to as the internal pressure. If, for example, the pressure prevailing in the accommodating chamber exceeds a pre-specifiable threshold value or limit value, the degassing unit opens, for example, at least one outflow opening or outlet opening. At least a portion of the fluid which is initially accommodated in the accommodating chamber can flow out of the accommodating chamber via the outlet opening, as a result of which at least a portion of the fluid is discharged from the accommodating chamber. An excessive value for the pressure prevailing in the accommodating chamber can be avoided in this way. In particular, the fluid may be a hot gas or a hot gas stream.

In order to now be able to realize particularly safe operation, in particular of the storage device and therefore of the motor vehicle overall, the invention makes provision for the degassing unit to be provided on the element base and to be designed to downwardly discharge the fluid from the accommodating chamber, in particular in the height direction of the vehicle or in the vertical direction, with respect to the installation position of the storage device. It has been found that particularly safe operation can be realized by discharging the fluid downward, that is to say in the negative z-direction for example, since particularly stringent safety requirements can also be met as a result. Usually, a structure which can, for example, particularly advantageously influence, in particular hold up or retain, the fluid is provided—with respect to the installation position—below the storage element, in particular below the element base or in the region of the element base, so that, for example, an excess quantity of the fluid can be prevented from undesirably escaping to the area surrounding the storage device overall at least over a particularly long period of time.

Here, the invention is based on the finding that the degassing unit is usually oriented in the positive z-direction, that is to say upwardly in the vertical direction or in the height direction of the vehicle, so that the fluid is usually discharged—with respect to the installation position—upwardly from the accommodating chamber and therefore from the storage element. According to the invention, a new orientation of the degassing unit, which is designed as a cell degassing unit for example, in comparison to conventional storage devices is now provided in order to be able to realize a particularly high degree of safety of the storage device, also referred to as a store. As part of this new orientation of the degassing unit, said degassing unit is oriented downwardly in the vertical direction or in the height direction of the vehicle and therefore in the negative z-direction, so that the, for example, hot fluid is not discharged upwardly, but rather downwardly, from the accommodating chamber.

In order to realize particularly safe operation, an advantageous refinement of the invention makes provision for at least one cooling line, through which a cooling medium, in particular a cooling fluid, can flow, for cooling at least one subregion of the storage device. For example, during operation of the storage device, the cooling medium, which is in the form of liquid or gas for example, flows through the cooling line, as a result of which at least said subregion of the storage device is cooled. This cooling of the subregion is performed, for example, by a transfer of heat from the subregion to the cooling medium. As a result, for example, excessive heating of the storage device can be avoided.

In this case, it has proven to be particularly advantageous when the degassing unit is aligned with the cooling line and in this way is designed to conduct the fluid, which flows out of the accommodating chamber via the degassing unit, to the cooling line and to melt the cooling line in this way by means of the fluid in order to in this way cause the cooling medium to escape from the cooling line. The cooling medium, which is also referred to as cooling means or refrigerant, can flow out of the cooling line as a result of said cooling line melting and as a result flow at least into regions of the storage device and in this way cool the regions, as a result of which, for example, the storage element and/or at least one adjacent, further storage element of the storage device can be cooled. By way of example, a fire in the storage device can be extinguished or avoided in this way.

If the fluid is, for example, a gas, the discharge of the fluid from the accommodating chamber is, for example, hot degassing by means of which the cooling line can be melted. By way of example, undesired effects which result from the hot degassing, such as fires for example, can be avoided owing to the cooling medium which can flow out of the cooling line due to said cooling line melting.

In this case, it has proven to be particularly advantageous when the cooling line is provided on, in particular in, the element base. As a result, the fluid can act, for example, at least substantially directly on the cooling line and said cooling line can be melted particularly quickly in this way.

A further embodiment is distinguished in that the storage device has a storage housing, in particular a module housing. The storage housing has at least one accommodating region, at least one storage base which at least partially, in particular at least predominantly or completely, downwardly delimits the accommodating region, in particular in the vertical direction or in the height direction of the vehicle, in the installation position of the storage device, and at least one storage cover which at least partially, in particular at least predominantly or completely, upwardly delimits the accommodating region, in particular in the vertical direction or in the height direction of the vehicle, in the installation position of the storage device, wherein the storage element, which is designed as a storage cell, in particular as a battery cell, for example, is arranged in the accommodating region. Therefore, the storage housing at least partially, in particular at least predominantly or completely, surrounds the storage element, so that the storage element can advantageously be protected by means of the storage housing. In particular, it is possible to collect and to retain the fluid, which flows out of the accommodating chamber and therefore out of the storage element, by means of the storage housing at least over a particularly long period of time, so that, for example, the fluid can be prevented from undesirably escaping to the area surrounding the storage housing at least temporarily and, in this case, in particular over a particularly long period of time. Particularly safe operation can be realized in this way.

A further embodiment is distinguished in that the cooling line is provided on, in particular in, the storage base. A multistage safety concept can be realized in this way. A first stage makes provision for the fluid which flows out of the storage element to initially be collected and retained by means of the storage housing. However, if, for example, a particularly large quantity of the fluid is released and/or the fluid is at a particularly high temperature, the cooling line which is provided on or in the storage base is melted for example, as a result of which a second stage of said safety concept is activated. As a result of the cooling line melting, the cooling medium can flow out of the cooling line and in this way cool, for example, at least respective regions of the storage device and also, for example, prevent the fluid catching fire or extinguish fires in the storage housing.

In order to realize a particularly high degree of safety, a further refinement of the invention makes provision for the storage base to have a larger wall thickness than the storage cover.

Here, the invention is based, in particular, on the following finding: if a thermal event in which a hot gas stream at a temperature of, for example, up to 1000 degrees Celsius subjects the upper storage cover to extreme thermal loading for several seconds occurs in a conventional storage device, which is designed as a battery in particular, for example, no fire and, respectively, no flames should be produced outside the storage housing for at least five minutes in order to realize particularly safe operation. However, the upper storage cover usually makes no contribution or hardly any contribution to the mechanical stability of the storage housing, and therefore the storage cover is usually manufactured from a lightweight and thin material, in particular sheet metal. As a result, it is very difficult to meet the abovementioned safety requirement.

However, since the invention now makes provision for the fluid to be downwardly discharged from the accommodating chamber, that is to say for the accommodating chamber to be downwardly degassed, the fluid which flows out of the accommodating chamber acts particularly strongly and, in particular, directly on the storage base, and not the storage cover, in comparison to conventional storage devices. Since the storage base has a considerably larger wall thickness than the storage cover, the storage base exhibits greater thermal stability than the storage cover since the storage base has a higher thermal mass than the storage cover. As a result, for example, the fluid can be retained in a particularly advantageous manner, so that, for example, escape of fire and/or flames from the storage housing can be considerably delayed more easily and more cost-effectively in comparison to the fluid acting directly on the storage cover. As a result, said safety requirement can be met in a simple and cost-effective manner at a low weight. Therefore, an expensive, thermally loadable design of the usually thin, lightweight storage cover can be avoided, so that the costs, the weight and the installation space requirement of the storage device can be kept particularly low while realizing particularly safe operation at the same time.

In order to realize particularly safe operation, a further refinement of the invention makes provision for the storage element to have at least one connection, in particular a plurality of connections, for providing the electrical energy which is stored by means of the storage means. In this case, the at least one connection is arranged on a first side, wherein the degassing unit is arranged on a second side of the storage element, which second side is averted from the first side. Therefore, degassing of the accommodating chamber takes place on the second side, which is averted from the first side and therefore from the at least one connection, and in particular downwardly, as a result of which a particularly high degree of safety can be ensured.

In a particularly advantageous embodiment of the invention, the storage device comprises at least one second storage element, the second element housing of which has at least one second accommodating chamber and at least one second element base which at least partially, in particular at least predominantly or completely, downwardly delimits the second accommodating chamber, in particular in the height direction of the vehicle or in the vertical direction, in the installation position of the storage device. The storage device, in particular the second storage element, has at least one second storage means, which is accommodated in the second accommodating chamber, for storing electrical energy or electric current. In addition, at least one second degassing unit is provided for discharging a fluid, which is released in the second accommodating chamber, from the second accommodating chamber. Here, the above and following embodiments relating to the first storage element can be readily transferred to the second storage element too, and vice versa.

For example, a particularly large amount of electric current can be stored by means of the storage device owing to the use of the plurality of storage elements. Furthermore, it is possible to be able to provide a particularly high electrical voltage by means of the storage device in order to be able to realize, for example, particularly high electrical powers for driving said motor vehicle.

Here, it has proven to be particularly advantageous when the degassing units have different orientations from one another and in this way are designed to discharge the respective fluids from the respective accommodating chambers in different directions from one another. In other words, the orientations of the respective degassing units of the respective storage elements, in particular within the accommodating region or the storage housing, are designed with alternating orientations. As a result, a thermal loading which is caused by the respective fluids which flow out of the respective accommodating chambers is distributed between different planes or different regions for example, as a result of which fire and flames can be prevented from escaping from the storage housing over a particularly long period of time or in principle. Owing to the advantageous distribution of the thermal loading between the different planes or into the different regions, a thermal requirement of the storage housing can, for example, be reduced in comparison to conventional storage devices in which, for example, the fluids are discharged from the accommodating chambers in the same direction, and therefore the costs, the installation space requirement and the weight of the storage device can be kept particularly low.

As part of the different orientations of the degassing units, provision is made, for example, for the first degassing unit to be provided on the first element base and to be designed to downwardly discharge the fluid, which flows out of the first accommodating chamber, from the first accommodating chamber, and as a result in a first direction, in particular in the vertical direction or in the height direction of the vehicle, with respect to the installation position of the storage device. In this case, the second degassing unit is designed, for example, to discharge the fluid from the second accommodating chamber in a second direction which is different from the first direction. The first direction and the second direction run, for example, obliquely or perpendicularly in relation to one another. Furthermore, it is conceivable for the first direction and the second direction to run at least substantially parallel in relation to one another, wherein the first direction is opposite to the second direction for example.

It has proven particularly advantageous here when the degassing units are provided on different sides of the storage elements. For example, the first degassing unit is arranged on a bottom side of the first storage element, which bottom side faces downward, in particular in the vertical direction or in the height direction of the vehicle, whereas, for example, the second degassing unit is arranged on a top side which faces upward, in particular in the vertical direction or in the height direction of the vehicle, or else is arranged on a side which faces in the transverse direction of the vehicle or in the vertical direction.

A second aspect of the invention relates to a motor vehicle, in particular a motor car, such as a passenger car for example. Here, the motor vehicle comprises at least one storage device according to the invention. Advantages and advantageous refinements of the first aspect of the invention are considered to be advantages and advantageous refinements of the second aspect of the invention, and vice versa.

Other objects, advantages and novel features of the present invention will become apparent from the following detailed description of one or more preferred embodiments when considered in conjunction with the accompanying drawing.

BRIEF DESCRIPTION OF THE DRAWING

Further details of the invention are evident from the following description of a preferred exemplary embodiment together with the associated drawing, in which the single FIGURE shows a schematic sectional view of a storage device according to the invention for storing electrical energy, in particular for a motor vehicle.

DETAILED DESCRIPTION OF THE DRAWING

The single FIGURE shows, in a schematic sectional view, a storage device, which is designated 1 overall, for storing electrical energy or electric current. The storage device 1 is, for example, a constituent part of a motor vehicle, not illustrated in the FIGURE, which is designed, in particular, as a motor car and in this case, for example, as a passenger car. The motor vehicle comprises at least one electrical machine by means of which, for example, at least one wheel of the motor vehicle, in particular the motor vehicle overall, can be electrically driven. To this end, the electrical machine can be operated, for example, in a motor mode and therefore as an electric motor. In order to operate the electrical machine in the motor mode and therefore to drive the motor vehicle or the wheel by means of the electrical machine, the electrical machine is supplied, for example, with electrical energy or electric current which is stored in the storage device 1. In this case, the storage device 1 is designed, for example, as a battery, in particular as a high-voltage battery. In other words, the storage device 1 is designed, for example, as a high-voltage component (HV component), so that the storage device 1, which is also referred to as a store, energy store or electrical energy store, has or provides an electrical voltage, in particular an electrical operating voltage, which has, for example, a value of more than 50 volts, in particular more than 60 volts. In particular, the electrical voltage which can be provided by the storage device 1 has a value of several 100 volts in order to be able to realize, for example, particularly high electrical powers for driving the motor vehicle in this way.

The storage device 1 has at least one storage element 2 which is designed as a storage cell for example and therefore is also referred to as a cell. In particular, the storage element 2 is designed as a battery cell for example. The storage element 2 has an element housing 3 which is also referred to as a cell housing. In this case, the cell housing has at least one accommodating chamber 4 and one element base 5, which is also referred to as a cell base, by way of which the accommodating chamber 4 is at least partially, in particular at least predominantly or completely, downwardly delimited in the installation position of the storage device 1. Furthermore, the storage device 1, in particular the storage element 2, comprises at least one storage means 6 which is accommodated in the accommodating chamber 4. Electrical energy or electric current can be stored by means of the storage means 6. To this end, the storage means 6 comprises, for example, an, in particular liquid, electrolyte and/or one or more electrodes.

The storage device 1 and therefore the storage element 2 assume their respective installation position in the fully manufactured state in which they are mounted in the motor vehicle for example, so that the storage device 1 assumes its installation position in the fully manufactured state of the motor vehicle for example. In this case, the height direction of the vehicle (z-direction) coincides with the vertical direction for example, so that the accommodating chamber 4 is at least partially, in particular at least predominantly or completely, downwardly delimited by means of the element base 5 in the height direction of the vehicle or in the vertical direction with respect to the installation position for example. The vertical direction or the height direction of the vehicle (z-direction) is illustrated by a double-headed arrow 7 in the FIGURE.

The storage device 1, in particular the storage element 2, furthermore has at least one degassing unit 8 by means of which a fluid, which is produced or released in the accommodating chamber 4, can be discharged from the accommodating chamber 4, in particular to the area surrounding the storage element 2. Said fluid is, for example, a gas or a gas stream and is released as a result of an accident-related application of force to the storage device 1. The fluid emerges, for example, from said electrolytes since, for example, the accident-related application of force results in strong heating of the electrolyte. Therefore, a gas as said fluid emerges, for example, from the electrolyte.

As the quantity of fluid which is released or emerges increases, a pressure prevailing in the accommodating chamber 4 for example increases, said pressure also being referred to as the internal pressure. If, for example, the pressure prevailing in the accommodating chamber 4 exceeds a threshold value or limit value, the degassing unit 8 opens, for example, at least one outlet opening via which at least a portion of the fluid which is initially accommodated in the accommodating chamber 4 can flow out of the accommodating chamber 4, in particular to the area surrounding the storage element 2. This discharge of the fluid from the accommodating chamber 4 is also referred to as degassing.

In order to now be able to realize particularly safe operation of the storage device 1 and therefore of the motor vehicle overall in a manner which is advantageous in respect of installation space, weight and cost, the degassing unit is provided on the element base 5 and is designed to downwardly discharge the fluid from the accommodating chamber 4 with respect to the installation position of the storage device 1, and in this case in the height direction of the vehicle or in the vertical direction. Here, in the FIGURE, an arrow 9 for example illustrates a first direction in which the fluid is discharged from the accommodating chamber 4 by means of the degassing unit 8. In this case, the direction which is illustrated by the arrow 9 coincides with the height direction of the vehicle or with the vertical direction and faces downward here.

In this case, the storage device 1 has at least one cooling line 10, through which a cooling medium, in particular a cooling liquid or a cooling gas, can flow and by means of which at least one subregion 11 of the storage device 1 can be cooled by way of heat transfer from the subregion 11, via the cooling line 10, to the cooling medium which flows through the cooling line 10. In this case, the degassing unit 8 is aligned with the cooling line 10 and as a result is designed to conduct the fluid, which flows out of the accommodating chamber 4 via the degassing unit 8, at least substantially directly to the cooling line 10. In this way, the cooling line 10 is melted by means of the fluid which flows out of the accommodating chamber 4 via the degassing unit 8, as a result of which the cooling medium escapes from the cooling line 10. As a result, the cooling medium emerging from the cooling line 10 can at least substantially directly cool the respective regions of the storage device 1, so that, for example, a fire can be counteracted.

It can be seen in the FIGURE that the storage device 1 has a storage housing 12. The storage housing 12 is, for example, a constituent part of a module, in particular a battery module, which comprises the storage housing 12, in particular as a module housing. In this case, the storage housing 12 has at least one accommodating region 13, at least one storage base 14 which at least partially, in particular at least predominantly or completely, downwardly delimits the accommodating region 13, in the height direction of the vehicle or in the vertical direction, in the installation position of the storage device 1, and at least one storage cover 15 which at least partially, in particular at least predominantly or completely, upwardly delimits the accommodating region 13 in the installation position of the storage device 1 and, in this case, in the vertical direction or in the height direction of the vehicle. In this case, the storage element 2 is arranged in the accommodating region 13 and therefore in the storage housing 12, wherein said module comprises the storage element 2 for example.

In the exemplary embodiment illustrated in the FIGURE, the cooling line 10 is provided on the storage base 14, wherein the cooling line 10 is arranged or runs, in particular, in the storage base 14. As an alternative or in addition, it is conceivable for the cooling line 10 and/or another, further cooling line through which the cooling medium can flow to be provided or arranged on, in particular in, the element base 5.

Furthermore, the storage base 14 has a larger wall thickness than the storage cover 15. Therefore, the storage base 14 has a higher thermal stability than the storage cover 15. Since the degassing unit 8 is now arranged on the element base 5 and degasses the accommodating chamber 4 in the first direction which is illustrated by the arrow 9, that is to say downwardly in the vertical direction or in the height direction of the vehicle, the fluid acts at least substantially directly on the storage base 14, and not the storage cover 15. As a result, a thermal loading on the storage cover 15, which thermal loading is caused by the fluid, can be kept low, and therefore said storage cover can continue to be configured in a slim manner and therefore in a manner which is advantageous in respect of weight and cost. In this case, the storage base 14 has the large wall thickness in any case in order to protect, for example, the storage element 2, in particular against objects which are initially arranged, for example, on a carriageway on and along which the motor vehicle is traveling and are flicked up by the motor vehicle. These objects can strike, for example, the storage base 14 but not penetrate the storage base 14 since said storage base has the large wall thickness.

The storage element 2 has electrical connections 16 via which the storage element 2 can provide the electrical energy which is stored by means of the storage means 6. In other words, the electrical energy which is stored in the storage element 2 can be discharged from the storage element 2 via the connections 16. In this case, the connections 16 are arranged on a first side 17 of the storage element 2, whereas the degassing unit 8 is arranged on a second side 18 of the storage element 2, which second side is averted from the first side 17. In this case, for example, the first side 17 faces upward in the height direction of the vehicle or vertical direction, whereas the second side 18 faces downward in the vertical direction or in the height direction of the vehicle and in so doing faces the storage base 14. In this case, in particular the element base 5 or the degassing unit 8 is downwardly covered by the storage base 14 in the vertical direction or in the height direction of the vehicle.

The storage device 1, in particular said module, has at least one second storage element 19, the second element housing 20 of which has at least one second accommodating chamber 21 and at least one second element base 22 which at least partially, in particular at least predominantly or completely, downwardly delimits the second accommodating chamber 21, in particular in the height direction of the vehicle or in the vertical direction, in the installation position of the storage device 1. In this case, the storage device 1, in particular the storage element 19, has at least one second storage means 23, which is accommodated in the second accommodating chamber 21, for storing electrical energy or electric current. In addition, the storage device 1, in particular the storage element 19, has at least one second degassing unit 24 by means of which a fluid, which is released or emerges in the second accommodating chamber 21, can be discharged from the second accommodating chamber 21, in particular to the area surrounding the storage element 19 or the element housing 20.

Furthermore, the storage element 19 has second connections 25 via which the electrical energy which is stored in the storage element 19 can be discharged from the storage element 19 or via which the storage element 19 can provide the electrical energy which is stored in the storage means 23. It can be seen in the FIGURE that the degassing units 8 and 24 have different orientations from one another and as a result are designed to discharge the respective fluids from the respective accommodating chambers 4 and 21 in different directions from one another.

Therefore, the degassing unit 24 is designed, for example, to degas the accommodating chamber 21 in a second direction which is different from the first direction and is illustrated by an arrow 26 in the FIGURE, so that the fluid can flow out of the accommodating chamber 21 in the second direction via the degassing unit 24. In this case, the first direction and the second direction run, for example, perpendicularly or askew in relation to one another. For example, the first direction runs perpendicularly in relation to a first plane, while the second direction runs perpendicularly in relation to a second plane. In this case, the planes run, for example, obliquely or perpendicularly in relation to one another. The accommodating chamber 21 is degassed, for example, in the vertical direction or in the transverse direction of the vehicle and therefore laterally by means of the degassing unit 24, while the accommodating chamber 4 is downwardly degassed by means of the degassing unit 8. Owing to these alternating orientations of the degassing units 8 and 24, a thermal loading of the storage device 1, which thermal loading is caused by the fluids, in particular in the accommodating region 13, can be distributed between different planes or in different subregions, so that a locally particularly high thermal loading of the storage housing 12 can be avoided. As a result, it is possible to prevent fire or flames escaping or emerging from the storage housing 12 to the area 27 surrounding said storage housing, for example over a particularly long time period. As a result, particularly safe operation can be realized.

In order to realize the different orientations of the degassing units 8 and 24, said degassing units are arranged, for example, on different sides of the storage elements 2 and 19. Whereas the degassing unit 8 is arranged on that side 18 of the storage elements 2 and 19 which forms the bottom side, the degassing unit 24 is arranged laterally or on a further side of the storage elements 2 and 19, which further side is different from the side 18, wherein, for example, the accommodating region 13 is delimited by a side wall 28 of the storage housing 12 in the transverse direction of the vehicle or in the horizontal direction on said further side.

LIST OF REFERENCE SYMBOLS

1 Storage device
2 Storage element
3 Element housing
4 Accommodating chamber
5 Element base
6 Storage means
7 Double-headed arrow
8 Degassing unit
9 Arrow
10 Cooling line
11 Subregion
12 Storage housing
13 Accommodating region
14 Storage base
15 Storage cover
16 Connection
17 Side
18 Side
19 Second storage element
20 Second element housing
21 Second accommodating chamber
22 Second element base
23 Second storage means
24 Second degassing unit
25 Connection
26 Arrow
27 Surrounding area
28 Side wall The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A storage device of a motor vehicle configured to store electrical energy, the storage device comprising:
    a storage housing which has at least one accommodating region, at least one storage base which at least partially downwardly delimits the accommodating region in an installation position of the storage device, and at least one storage cover which at least partially upwardly delimits the accommodating region in the installation position of the storage device;
    wherein the storage base of the storage housing has a larger wall thickness than the storage cover of the storage housing;
    at least one storage element disposed in the accommodating region of the storage housing having an element housing which has at least one accommodating chamber and at least one element base which at least partially downwardly delimits the accommodating chamber of the storage element in the installation position of the storage device;
    at least one storage means, accommodated in the accommodating chamber of the storage element, configured to store electrical energy;
    at least one degassing unit configured to discharge fluid, which is released in the accommodating chamber of the storage element, from the accommodating chamber of the storage element, wherein the degassing unit opens an outlet opening and wherein at least a portion of the fluid which is released in the accommodating chamber of the storage element is flowable out of the accommodating chamber of the storage element through the outlet opening,
    wherein the degassing unit is disposed on the element base of the storage element and is oriented downwardly in a vertical direction of the motor vehicle such that fluid from the accommodating chamber of the storage element is discharged downwardly into the accommodating region of the storage housing with respect to the installation position of the storage device, and
    at least one cooling line, through which a cooling medium flows, configured to cool at least one subregion of the storage device,
    wherein the degassing unit is aligned with the cooling line and configured to conduct fluid, which flows out of the accommodating chamber via the degassing unit, to the cooling line and to melt said cooling line using fluid such that the cooling medium escapes from the cooling line.

2. The storage device according to claim 1, wherein the cooling line is provided on the element base of the storage element.

3. The storage device according to claim 1, wherein the cooling line is provided on the storage base of the storage housing.

4. The storage device according to claim 1,
    wherein the storage element has at least one connection configured to provide the electrical energy stored by storage means, wherein the at least one connection is arranged on a first side and the degassing unit is arranged on a second side of the storage element, which second side is averted from the first side.

5. The storage device according to claim 1,
    wherein at least one second storage element having a second element housing which has at least one second accommodating chamber and at least one second element base, which at least partially downwardly delimits the second accommodating chamber in the installation position of the storage device;
    at least one second storage means accommodated in the second accommodating chamber and configured to store electrical energy; and
    at least one second degassing unit configured to discharge fluid, which is released in the second accommodating chamber, from the second accommodating chamber.

6. The storage device according to claim 5,
    wherein the degassing unit and the at least one second degassing unit have different orientations from one another and are configured to discharge fluids from the respective accommodating chambers in different directions from one another.

7. The storage device according to claim 5, wherein the degassing unit and the at least one second degassing unit are provided on different sides of the storage elements.

8. A motor vehicle, comprising:
    the storage device according to claim 1.

* * * * *